United States Patent [19]

Constance

[11] Patent Number: 4,676,427
[45] Date of Patent: Jun. 30, 1987

[54] MASTER CYLINDER FLANGE ATTACHMENT

[75] Inventor: William J. P. Constance, Gwent, Wales

[73] Assignee: Lucas Industries Public Limited Company, Birmingham, England

[21] Appl. No.: 817,338

[22] Filed: Jan. 9, 1986

[30] Foreign Application Priority Data

Jan. 17, 1985 [GB] United Kingdom ............... 8501137

[51] Int. Cl.⁴ .............................................. B23K 31/02
[52] U.S. Cl. ................................... 228/189; 219/59.1; 219/93; 219/107; 403/282
[58] Field of Search ................. 228/189; 219/93, 59.1, 219/107; 403/274, 276, 279, 282; 182/229

[56] References Cited

U.S. PATENT DOCUMENTS 3,483,349 12/1969 Wanner .................................. 219/93

FOREIGN PATENT DOCUMENTS 571296 2/1933 Fed. Rep. of Germany ...... 182/228
587952 5/1947 United Kingdom ................ 182/228

Primary Examiner—Nicholas P. Godici
Assistant Examiner—Samuel M. Heinrich
Attorney, Agent, or Firm—Holman & Stern

[57] ABSTRACT

A method of making an assembly including a metal tube and a surrounding flange member comprises providing an abutment shoulder at the open end of the tube, passing a spacer sleeve along the tube into engagement with the shoulder, placing the flange member in engagement with a flange of the sleeve and welding one end of the spacer sleeve to the shoulder and the other end thereof to the flange. It is alternatively possible for the flange and sleeve to be integrally formed, in which case only welding to the shoulder is required.

14 Claims, 8 Drawing Figures

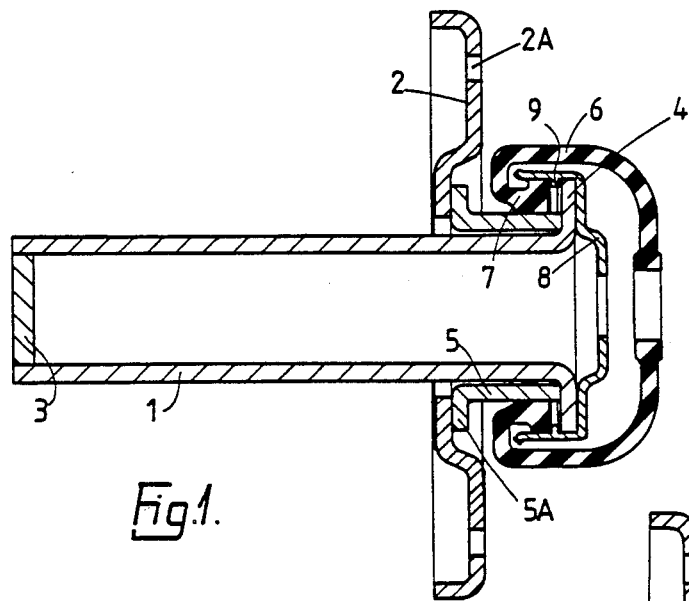
Fig.1.
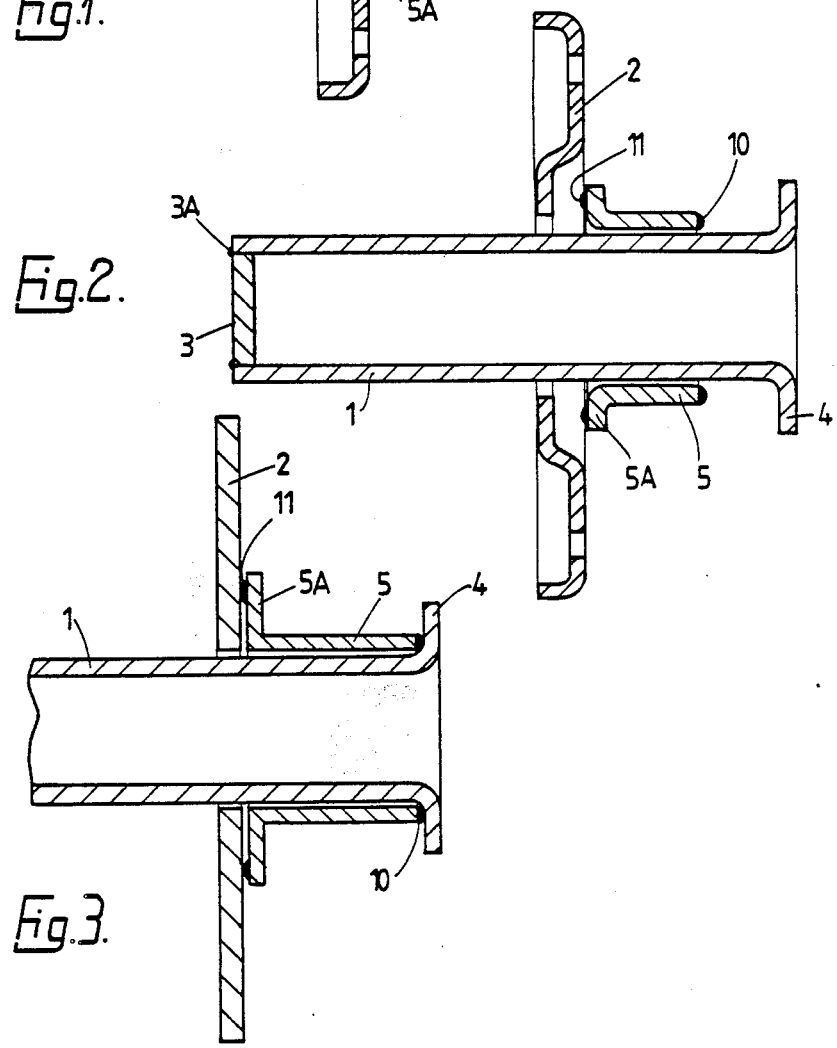
Fig.2.
Fig.3.

MASTER CYLINDER FLANGE ATTACHMENT

BACKGROUND OF THE INVENTION

1. Field of the Invention

This invention relates to a method of making an assembly including a metal tube and a surrounding body, and also to such an assembly produced by application of the method and useful, for example, as the pressure cylinder of a vehicle hydraulic system master cylinder for brake or clutch actuation, the surrounding body then being in the form of an outwardly projecting flange serving for the mounting of the assembly on a vehicle.

2. Description of the Prior Art

One conventional manner of securing a surrounding flange to a pressure cylinder is to provide the flange with an aperture of slightly smaller diameter than the cylinder external dimension at the intended flange location, and pressing the flange onto the tube at said location. Such a pressing operation can engender a large radially inward force on the cylinder wall, which sometimes results in unacceptable distortion of the cylinder bore and consequently in additional machining to correct the distortion, or scrapping of the assembly. A further disadvantage of the aforesaid conventional procedure is that, in order for the flange to have sufficient internal surface area around its bore to be afforded stable support on the cylinder, and also for it to be sufficiently substantial to withstand the pressing operation, it has been necessary for the flange to be of substantial thickness, which increases the weight of the assembly undesirably and represents additional cost.

It has been proposed to weld the flange in position in order to reduce the risk of the flange and tube becoming separated in use, but the application of welding heat to the tube is a further factor which may give rise to tube distortion.

BRIEF SUMMARY OF THE INVENTION

An object of the present invention is to provide an improved method of making an assembly including a metal tube and a surrounding body, such as a flange, which alleviates or avoids the problems above referred to.

According to the invention, a method of making an assembly including a metal tube and a surrounding body comprises providing an abutment at a desired location on the tube, placing said body in surrounding relationship to the tube and moving it along the tube to a position in which it is spaced from said abutment by an interposed spacer element engaging said abutment, and effecting a securing operation between at least the spacer element and tube.

Preferably, said tube abutment is formed by flaring an open end of the tube. The securing operation may conveniently be effected by welding or bonding.

The body and spacer elements may be separate components, in which case said securing operation is also effected between these components. Typically, the body and spacer elements may be secured together as a sub-assembly prior to being placed around the tube.

Alternatively, the body and spacer elements may be integrally formed, conveniently by pressing or rolling, prior to being placed on the tube. It can then be advantageous to bond this integral component to the tube with the spacer in engagement with the abutment.

Typically, the spacer element is a generally cylindrical sleeve having an internal diameter slightly greater than the external tube diameter, said sleeve being formed at one end thereof with a generally radial projection, preferably in the form of a continuous peripheral radial flange, for engagement by the surrounding body.

Conveniently, the tube may be initially open at both ends and the method then includes the step of permanently closing one of the tube ends, by securing therein an end closure element, preferably by welding. In one practical form of the method, the end of the tube to be closed is formed with an internal shoulder and the closure element, usually in the form of a disc-like plug is brought into abutment with the shoulder, an end portion of the tube being deformed inwardly against the adjacent face of said element and the element being then secured by welding to said inwardly deformed portion. This arrangement is thought to be particularly effective for withstanding high internal cylinder pressures, such as occur, for example, in a brake or clutch master cylinder.

BRIEF DESCRIPTION OF THE DRAWINGS

The invention will now be described, by way of example, with reference to the accompanying drawings wherein:-

FIG. 1 is a longitudinal cross-sectional view which illustrates one form of assembly made by the method of the invention, being a pressure cylinder for use in an hydraulic system;

FIG. 2 is a longitudinal cross-sectional view which illustrates one stage in the method of the invention for producing the pressure cylinder of FIG. 1;

FIG. 3 is a view similar to FIG. 2 illustrating another stage in the method of the invention;

DETAILED DESCRIPTION

Figure 4:
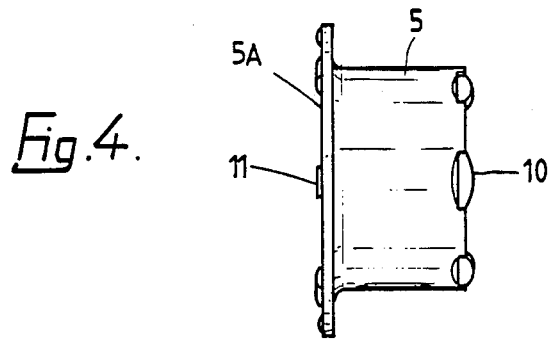
FIG. 4 is a side elevational view of one component of the assembly.

Referring to FIG. 1, this illustrates a pressure cylinder, primarily for use in a vehicle hydraulic clutch or brake actuating system, and including a cylinder 1 and a radially extending mounting flange 2 having holes 2A for the reception of fixing bolts or the like. The invention is concerned particularly with the attachment of the flange 2 to the cylinder 1.

The cylinder 1 is preferably in the form of a drawn tube of uniform cross-section, open at both ends. One end of the tube is closed by means of a plug 3 which would normally be inserted and secured as a final step in the method, as will be described hereinafter. The open end portion of the tube 1 is flared outwardly to provide a flange 4 acting as an abutment against which a sleeve 5 is brought into engagement, the sleeve 5 itself having a radial flange 5A against which the flange 2 is brought into engagement and secured. A protective boot 6 has a bead 7 which is located behind the flange 4 and trapped between the outer surface of the sleeve 5 and a retaining clip 8. The clip 8 is provided with a series of crimps 9 around its internal periphery and has a certain resilience such that it can be deformed to enable the crimps 9 to pass over the outer edge of the flange 4 and, by resilient recovery of the device, become located behind the flange 4, as shown. In this manner, the retainer 8 is fixed axially relative to the cylinder 1 and can advantageously serve as a piston stop and push rod retention device, thereby eliminating the use of conventional circlips and consequent machining of annular grooves for the reception thereof.

FIG. 4 illustrates the sleeve 5 in more detail and it will be seen that it initially is provided with a number of pressed-out projections 10 from the end surface of the plain end of the tube, and also with further projections 11 pressed into the flange 5A so as to project axially beyond the normally axially outward extend of the flange. These projections 10, 11 are for use in a subsequent projection welding operation, as will be described.

The method of the invention is typically carried out by first manipulating one end of the tube 1 so as to flare it outwardly and thereby produce the flange 4. Once this has been done, the sleeve 5 is introduced onto the outer surface of the tube 1 in surrounding relationship and moved along the tube towards the flange 4. The sleeve 5 is arranged so that its own flange 5A faces in the opposite direction to the flange 4. The mounting flange 2 is then also placed around the tube 1 and moved therealong towards the flange 5. FIG. 2 illustrates an intermediate stage of the method in which the sleeve 5 and flange 2 are located on the tube 1 but still displaced from their final positions for illustrative purposes.

The next stage in the procedure is illustrated in FIG. 3 in which the sleeve 5 is moved so as to bring the projections 10 into engagement with the tube flange 4, and the mounting flange 2, shown alternatively in this drawing as a flat plate, is moved into engagement with the projections 11 on the flange 5A. The projections 10 and 11 are provided for the purpose of permitting projection welding of the components together and this is now effected by applying an axial force such as to urge the sleeve 5 and mounting flange 2 towards the flange 4 and applying an appropriate electric current such that the projections 10 and 11 fuse and welding is effected between the sleeve and the flange 4 at one end and mounting flange 2 at the other end. It will be seen that the welding locations are spaced from the tube 1 with the advantage that no significant welding heat is applied to the tube 1 and deformation of the internal bore of the tube is minimized.

The insertion of the plug 3 to seal the end of the tube remote from the mounting flange is typically deferred until the flange welding operation has been completed, so that there is an unobstructed view along the bore which facilitates inspection of the latter to detect any untoward scoring or other deformation of the internal wall. Once the inspection has been completed, the plug, which is dimensioned to have an interference fit within the tube, is inserted and secured in place and sealed around its periphery by welding, as represented at 3A in FIG. 2. The preferred welding method for this purpose is Tungsten Inert Gas (T.I.G.) welding, although other methods are not precluded.

Figure 5:
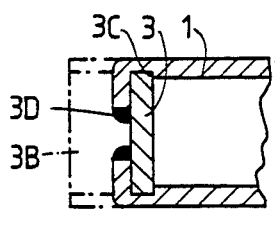
FIGS. 5 to 7 are cross-sectional views showing details of parts respectively of alternative embodiments of the assembly of the invention, the latter being in an intermediate stage of manufacture.
Figure 6:
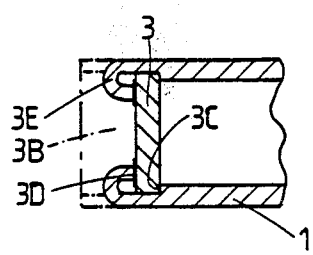

FIGS. 5 and 6 illustrate alternative ways of securing the end plug 3 within the end of the cylinder 1. In FIG. 5, an end portion 3B of the bore is opened out to create an internal shoulder 3C, against which the plug 3 is urged when inserted, again as an interference fit, within the opened out bore portion. The end portion 3B is then manipulated so as to roll it over inwardly against the outer face of the plug 3, in order to provide a secure abutment against pressure urging the plug axially outwardly. The plug is then finally secured in position and sealed by T.I.G. or other suitable welding at 3D.

In the preferable alternative illustrated in FIG. 6, a similar opening out of a bore portion 3B is effected, again to create a shoulder 3C, the essential difference being that the end portion 3B is manipulated so as to roll a portion 3E thereof back on itself to provide the necessary abutment surface after interference fitting of the plug 3. T.I.G. or other suitable welding is then effected between the rolled back portion 3E and the plug 3 to secure and seal the plug. It is found that the arrangement of FIGS. 5 and 6, and particularly that of FIG. 6, provides an effective resistance against the very high pressures prevailing within the cylinder 1 when the cylinder is used as a master cylinder in a vehicle hydraulic clutch or braking hydraulic system.

Figure 7:
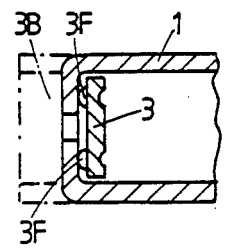

As will be seen from FIG. 7, a further alternative plug fixing can be effected by simply manipulating the end portion 3B to roll it over inwardly so as to provide an abutment for the plug 3, this time inserted from the open end of the tube 1. The plug is provided with pressed out welding projections 3F which are placed against the abutment, as shown, welding being effected by the passage of electric current to fuse the projections.

Figure 8:
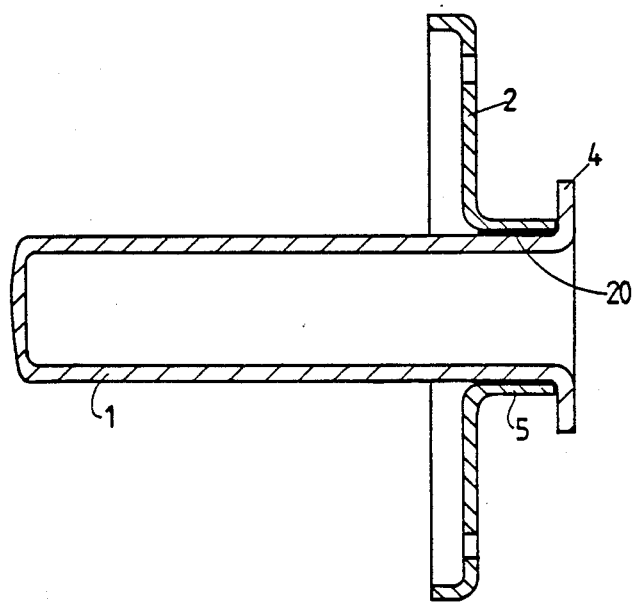
FIG. 8 is a cross-sectional view similar to FIG. 1 showing a further alternative embodiment of the assembly made by the method of the invention.

In the embodiment illustrated in FIG. 8, the flange 2 and sleeve 5 are formed integrally, as by rolling or pressing for example, and the tube 1 is formed as a single deep drawn component with one open end surrounded by the flange 4. The method of forming the tube and flange assembly in this case is to provide a layer 20 of adhesive or other suitable bonding material either on the outer surface of the tube or on the internal surface of the sleeve 5, and place the components in the positions illustrated with the free end of the sleeve abutting the flange 4 in order to set the final position of the flange 2 on the tube. It would alternatively be possible to employ a welding technique for securing the flange/sleeve assembly and the tube could be a fabricated assembly, as in the previously described embodiments.

It will be appreciated that the use of the method of the invention enables a mounting flange to be securely attached to a tube 1 by welding, without the necessity for welding to any part of the tube which, in use, is swept internally by the piston, thereby avoiding deformation of the cylinder bore by the heat of welding, and also makes possible the use of a relatively light-weight mounting flange. Moreover, the use of the sleeve 5 and abutment 4 on the tube sets the position of the flange 2 on the tube in a simple and effective manner and thereby greatly facilitates manufacture and assembly of the components. The invention also provides various effective ways of sealing an open tube end when open ended steel tube is employed in the method of the invention.

Although the invention has been described in relation to pressure cylinders for vehicle hydraulic systems, it may be used in the manufacture of other assemblies such as shock absorbers for example, which include a metal tube and surrounding flange of other body.

I claim:

1. A method of making a master cylinder assembly including a metal tubular member and a flange body member mounted in surrounding relationship on the tubular member, comprising:

providing a metal tubular member having an open end;

flaring said open end of said tubular member to produce a radially outwardly extending abutment;

positioning said flange body member in surrounding relationship on said tubular member;

providing a spacer member having a predetermined length interposed between said abutment and said flange body member;

moving said flange body member along said tubular member into a position where said flange body member is spaced from said abutment by said predetermined length with said spacer member engaging said abutment of said tubular member; and securing at least said spacer member to said tubular member.

2. A method as claimed in claim 1 wherein said securing step comprises:
welding.

3. A method as claimed in claim 1 wherein said securing step comprises:
bonding.

4. A method as claimed in claim 3 wherein said spacer member comprises:
a generally cylindrical sleeve having an internal diameter slightly greater than the external diameter of said tubular member.

5. A method as claimed in claim 1 wherein said spacer member comprises:
a generally cylindrical sleeve having an internal diameter slightly greater than the external diameter of said tubular member.

6. A method as claimed in claim 1 wherein:
said flange body member and spacer member are separate components; and further comprising
securing said flange body member to said spacer member.

7. A method as claimed in claim 5 and further comprising:
providing a generally radial projection on said spacer member for engagement by said flange member.

8. A method as claimed in claim 7 and further comprising:
forming said projection in the form of a continuous peripheral radial flange.

9. A method as claimed in claim 1 and further comprising:
integrally forming said spacer member and said flange body member.

10. A method as claimed in claim 9 wherein:
said spacer member comprises a cylindrical sleeve; and further comprising
bonding between the inner and outer cylindrical surfaces respectively of said spacer member and tubular member.

11. A method as claimed in claim 1, wherein said tubular member is initially open at both ends, and further comprising:
permanently closing one of the tube ends by securing therein an end closure element.

12. A method as claimed in claim 11 and further comprising:
forming the end of the tube to be closed with an internal shoulder;
positioning the closure element into abutment with the shoulder;
deforming an end portion of said tubular member inwardly against the adjacent face of said closure element; and
securing said closure element to the inwardly deformed portion.

13. A method as claimed in claim 11 and further comprising deforming an end portion of said tubular member inwardly to form an abutment;
moving the closure element along the inside of said tubular member into engagement with the abutment; and
securing said closure element to the abutment.

14. A method as claimed in claim 11 wherein:
said securing step comprises welding.

* * * * *